(12) United States Patent
West

(10) Patent No.: US 9,164,954 B2
(45) Date of Patent: Oct. 20, 2015

(54) VENDING ACCOMMODATION AND ACCESSIBILITY

(71) Applicant: Ryan Lee West, Newnan, GA (US)

(72) Inventor: Ryan Lee West, Newnan, GA (US)

(73) Assignee: The Coca-Cola Company, Atlanta, GA (US)

( * ) Notice: Subject to any disclaimer, the term of this patent is extended or adjusted under 35 U.S.C. 154(b) by 336 days.

(21) Appl. No.: 13/647,203

(22) Filed: Oct. 8, 2012

(65) Prior Publication Data

US 2014/0100691 A1    Apr. 10, 2014

(51) Int. Cl.
*G06F 17/00*    (2006.01)
*G07F 9/00*    (2006.01)
*G07F 11/00*    (2006.01)

(52) U.S. Cl.
CPC    *G06F 17/00* (2013.01); *G07F 9/00* (2013.01); *G07F 11/00* (2013.01)

(58) Field of Classification Search
CPC ............ G07F 11/00; G07F 9/00; G06F 17/00
See application file for complete search history.

(56) References Cited

U.S. PATENT DOCUMENTS

| | | | |
|---|---|---|---|
| 5,831,862 A | 11/1998 | Hetrick et al. | |
| 6,049,328 A | 4/2000 | Vanderheiden | |
| 6,061,666 A | 5/2000 | Do et al. | |
| 6,384,743 B1 | 5/2002 | Vanderheiden | |
| 6,464,135 B1 * | 10/2002 | Cohen et al. | 235/379 |
| 6,572,884 B1 * | 6/2003 | Pai et al. | 424/455 |
| 6,624,803 B1 | 9/2003 | Vanderheiden et al. | |
| 6,999,066 B2 | 2/2006 | Litwiller | |
| 7,040,535 B2 | 5/2006 | Sato et al. | |
| 7,251,344 B2 | 7/2007 | Sakata et al. | |
| 7,363,060 B2 | 4/2008 | Bernhart et al. | |
| 7,480,865 B2 | 1/2009 | Lin | |
| 7,494,053 B1 * | 2/2009 | Burns | 235/379 |
| 7,552,868 B1 | 6/2009 | Block et al. | |
| 7,644,039 B1 * | 1/2010 | Magee et al. | 221/9 |
| 7,735,012 B2 | 6/2010 | Naik | |
| 7,757,173 B2 | 7/2010 | Beaman | |
| 8,170,713 B2 | 5/2012 | Levasseur et al. | |
| 8,733,641 B1 * | 5/2014 | Drew et al. | 235/381 |
| 8,803,139 B2 * | 8/2014 | Puntambekar et al. | 257/40 |
| 2005/0234590 A1 | 10/2005 | Sato et al. | |
| 2006/0195222 A1 | 8/2006 | Ringer et al. | |
| 2008/0283548 A1 | 11/2008 | Miller | |
| 2009/0313139 A1 | 12/2009 | Nam et al. | |

(Continued)

OTHER PUBLICATIONS

Search Report and Written Opinion for International Application No. PCT/US13/63629 dated Jun. 6, 2014.

*Primary Examiner* — Timothy Waggoner
(74) *Attorney, Agent, or Firm* — Sutherland Asbill & Brennan LLP

(57) ABSTRACT

Vending accommodation and accessibility is described in connection with completing transactions by a machine. In certain aspects, the method includes entering an accommodation mode based on a user selection, displaying an accommodation menu comprising at least one selection button and a list of items available for vending, and announcing a selected item of the list of items available for vending. In other aspects, the method includes determining whether an item has been selected for vending based on touching at least one selection button according to instructions to a relative position of the selection button on a display screen. When determining that an item has been selected for vending, the method further includes prompting for payment to complete a transaction for the item.

19 Claims, 6 Drawing Sheets

(56) References Cited

U.S. PATENT DOCUMENTS

| | | |
|---|---|---|
| 2010/0191369 A1 | 7/2010 | Kim |
| 2010/0235240 A1 | 9/2010 | Park et al. |
| 2010/0262280 A1 | 10/2010 | Miller et al. |
| 2010/0268792 A1* | 10/2010 | Butler et al. ................. 715/810 |
| 2010/0286819 A1 | 11/2010 | Walker et al. |
| 2010/0324725 A1 | 12/2010 | Liu et al. |
| 2011/0022980 A1 | 1/2011 | Segal et al. |
| 2011/0222784 A1 | 9/2011 | Rowe et al. |
| 2011/0297691 A1 | 12/2011 | Freeman |
| 2012/0158171 A1 | 6/2012 | Day et al. |
| 2012/0239189 A1* | 9/2012 | Jaud et al. ..................... 700/236 |

* cited by examiner

VENDING ACCOMMODATION AND ACCESSIBILITY

BACKGROUND

Vending machines store and sell products without the need for a salesperson to complete a sales transaction. Some vending machines include a display window through which products available for purchase are visible by customers. In operation, a purchaser identifies a selection input such as a selection button or product number corresponding to a desired product, for example, by looking through the display window. After identifying the desired product, the purchaser tenders payment to the vending machine and provides a selection input to operate the machine. Upon tender of full payment and selection of the product via the selection input, the vending machine deposits the selected product into a vending tray by one of various mechanical means for vending the product.

Generally, it is desirable to engineer vending machines so that any purchaser may easily use the machine to make a product purchase. For example, it is desirable to engineer vending machines for use by both children and adults. The design of vending machines may further include considerations based on the needs of those having disabilities such as hearing or visual impairments. Particularly, vending machines should be designed to accommodate persons that are visually impaired, because it may be especially difficult to use the machine without the ability to see the products available for purchase or read the provided instructions.

In the context of vending machine design, it would be desirable if a vending machine were designed especially to account for assisting those persons with a disability. Particularly, it would be desirable for a vending machine to include design characteristics that aid persons with disabilities to make purchases of products available for vending.

SUMMARY

In one embodiment, a method for accommodation and accessibility is described, including receiving an instruction to enter accommodation mode, and entering an accommodation mode and resetting and starting an accommodation mode timer after receiving the instruction. Once in accommodation mode, the method further includes displaying an accommodation menu comprising at least one selection button and a list of items available for vending, and announcing a selected item of the list of items available for vending. Displaying at least one button may include displaying a first button and a second button on a display screen, the first button being proximate to a lower right corner of the display screen and the second button being proximate to a lower left corner of the display screen, for example. The announcement of the selected item may include, in certain aspects, an announcement of at least one of a product type or name of the item, a volume or amount of the item, and a price for the item. In other aspects, the announcement may include an item number of the selected item in the list of items available and a total number of items in the list of items available.

The method may include determining whether the selected item has been selected for vending based on a touch or multiple-press of the at least one selection button and, when determining that the selected item has been selected for vending, prompting for payment. After prompting for payment, certain embodiments of the method include resetting and starting a payment timer, and determining whether at least partial payment has been tendered before expiration of the payment timer. Additionally, certain embodiments may include resetting the payment timer when determining that at least partial payment has been tendered before expiration of the payment timer.

In certain aspects, the method may include determining whether the selected item has not been selected for vending and, when determining that the selected item has not been selected for vending, selecting a next item of the list of items available for vending. The next item may also be announced in certain embodiments. The method may also include starting and resetting an accommodation mode timer and, after receiving the instruction to enter accommodation mode, determining whether the accommodation mode timer has expired. The accommodation mode may be exited upon determining that the accommodation mode timer has expired.

In other aspects, the method may include determining whether full payment has been tendered or authorized or whether partial payment has been tendered and, when determining that partial payment has been tendered, announcing an amount of partial payment or an additional amount required for tender of full payment. Also, when determining that full payment has been tendered or authorized, vending the selected item.

In another embodiment, a method for accommodation and accessibility is described including displaying an accommodation menu on a display screen, the accommodation menu comprising a list of items available for vending and at least one selection button proximate to a corner of the display screen. In one aspect, the method includes determining whether the selected item has been selected for vending based on a touch or multiple-press of the at least one selection button and, when determining that the selected item has been selected for vending, prompting for payment.

In another embodiment, an apparatus for accommodation and accessibility is described including a display screen that displays an accommodation menu. The accommodation menu may comprise a list of items available for vending and at least one selection button proximate to a lower corner of the display screen, the at least one selection button being displayed at least a predetermined distance from a corner of the display screen and at least a predetermined distance from a side edge of the display screen. The apparatus may also include a point of sale device for tendering payment and a control system. In certain aspects, the control system is configured to determine whether the selected item has been selected for vending based on a touch or multiple-press of the at least one selection button and, when determining that the selected item has been selected for vending, prompt for payment.

In still another embodiment, an apparatus for accommodation and accessibility is described including a display screen having a substantially smooth surface that displays items available for vending, a speaker, and a control system. The control system of the apparatus may be configured to announce instructions for entry into an accommodation mode of operation. In certain aspects, the control system may be further configured to monitor an accommodation mode entry area proximate to a corner of the display screen for a multiple-press and, upon entry into the accommodation mode of operation, announce instructions for selection and non-selection of at least one item available for vending and monitor selection and non-selection areas proximate to two corners of the display screen for a multiple-press.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

Figure 1:
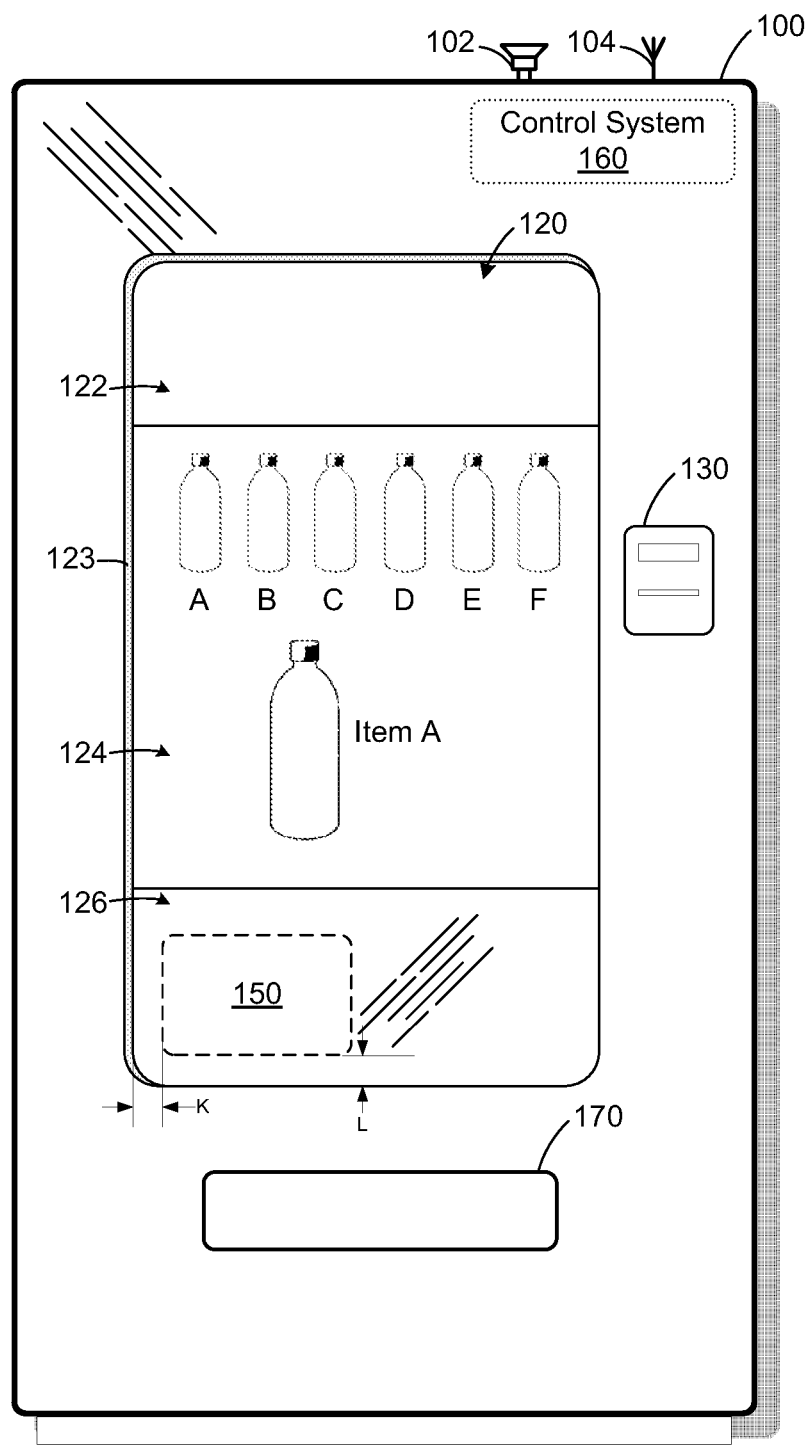
FIG. 1 provides an illustration of a vending machine for disability accommodation according to an example embodiment described herein.

The drawings illustrate only exemplary embodiments and are therefore not to be considered limiting of the embodiments described herein scope, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar references numerals between figures designates like or corresponding, but not necessarily identical, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. Among the embodiments described herein, some aspects may be implemented by a computer program executed by one or more processors, as described and illustrated. As would be apparent to one having ordinary skill in the art, the present invention may be implemented, at least in part, by computer-readable instructions in various forms, and the present invention is not intended to be limited to a particular set or sequence of instructions executed by the processor.

At the outset, it is noted that the vending machines described in connection with the embodiments below is provided by way of example only. As one skilled in the art would recognize, the embodiments described herein may be applied to any type of vending machine, regardless of the type or brand of products sold or the aesthetic style of the vending machine, for example. Further, aspects of the method and apparatus embodiments for accommodation described herein may be applied to fields other than vending accommodation, as would be recognized by those having ordinary skill in the art.

Turning now to the drawings, in which like numerals indicate like, but not necessarily the same, elements throughout, exemplary embodiments of the invention are described in detail.

FIG. 1 illustrates a vending machine 100 for accommodation and accessibility according to an example embodiment described herein. The vending machine 100 includes a display screen 120, a speaker 102, a communication means 104, a point of sale device 130, and a control system 160. The control system 160 is electrically and communicatively coupled to the other elements of the vending machine 100 and controls, monitors, and/or coordinates many of the operations of the vending machine 100. In certain aspects, the control system 160 includes a general purpose computer or control system including a bus for communication with the other system components and elements, as further described below. By way of example and not limitation, the control system 160 may include aspects of the control systems described in U.S. Pat. Nos. 5,959,869, 6,119,053, and/or U.S. Pat. No. 7,593,867, each of which is hereby incorporated herein by reference in its entirety.

The control system 160 may comprise a Vending Machine Controller ("VMC") including a programmable processor that controls operation of the vending machine 100. The VMC may include one or more communications ports communicatively coupled to the programmable processor. In certain embodiments, at least one of the communications ports may be configured as a multi-drop bus ("MDB") interface, a Universal Serial Bus ("USB") interface, and/or a Vendor Control COCA-COLA System ("VCCS") bus interface, for data communications between the programmable processor and one or more other vending peripherals of the vending machine 100, such as the display screen 120, the speaker 102, the communication means 104, the point of sale device 130, a vending dispenser, a coin dispenser, or vending mechanism, for example. One or more of the MDB, USB, and VCCS interfaces may conform to certain bus standards. For example, the MDB may conform to the "International Multi-Drop Bus Interface Standard," established by the National Automatic Merchandizing Association of Chicago, Ill. The example bus interfaces between the system components of the vending machine 100 described above are not intended to be exhaustive, and the vending machine 100 may include other well known vending machine bus interfaces and system components.

It is noted that, to interface between certain peripherals or system elements, such as between the display screen 120 and the control system 160, additional controllers or sub-controllers may be relied upon in certain embodiments. For example, the programmable processor of the control system 160 may be communicatively coupled, via one or more of the MDB interface, the USB interface, and/or the VCCS interface, to a separate display controller of the display screen 120. In turn, the display controller of the display screen 120, which may comprise a separate computing and/or controller device, can be coupled to the display screen 120 via a display connector such as a Video Graphics Array ("VGA"), Digital Video Interface ("DVI"), Separate Video ("S-Video"), or High-Definition Multimedia Interface ("HDMI") connector. Additionally, the controller of the display screen 120 may also be coupled to a touch interface of the display screen 120 via a USB interface, for example. In other embodiments, the control system 160 may include an integrated display controller and interface directly with the display screen 120.

Generally, the display screen 120 displays items available for purchase using the vending machine 100. In certain embodiments, the display screen 120 also displays advertisements and details regarding the items available for purchase. It is noted that the display screen 120 comprises a substantially smooth display surface and is provided in place of a display window, as commonly provided in conventional vending machines. The display screen 120 provides certain advantages and flexibility, such as the opportunity to display advertisements, for example, in addition to images associated with items available for purchase. In various embodiments, the display screen 120 may range in size, shape, and position. For example, the display screen 120 may range from a few inches to several inches or several tens of inches in diagonal size. Further, the display screen 120 may be positioned at a different location on the front surface of the vending machine 100 as compared to the arrangement illustrated in FIG. 1.

As noted above, the display screen 120 provides flexibility for the vending machine 100. For example, the images displayed on the display screen 120 may be updated wirelessly over time, for example, without the requirement for service to the vending machine 100. In certain embodiments, the display screen 120 may be graphically or visually divided or partitioned into display sections such as display sections 122, 124, and 126. The display screen 120 may be divided into sections, for example, so that advertisements, product logos, marks, and/or videos, for example, may be displayed in display section 122 while items available for purchase are displayed in the display section 124. It is noted that the display sections 122, 124, and 126 illustrated in FIG. 1 are provided by way of example only and other partitions of the display screen 120 are within the scope and spirit of the embodiments described herein. The display screen 120 is generally controlled by the control system 160 as described in further detail below. The control system 160 is generally configured in various embodiments to coordinate the operations of the vending machine 100 and, thus, is electrically and communicatively coupled to the other elements of the vending machine 100 as described above.

The speaker 102 provides audible feedback to users of the vending machine 100. For example, the speaker 102 may provide instructions for using the vending machine 100 and details surrounding items available for purchase at the vending machine 100. In certain aspects of embodiments described below, the speaker 102 provides instructions for users with disabilities, so that the users do not need to view the images on the display screen 120. The speaker 102 may also provide music or advertising dialogue in connection with a current display on the display screen 120, for capturing the attention of potential purchasers.

In various embodiments, the communication means 104 comprises any well known wired or wireless communication means, such as a cellular modem or Ethernet network interface card, for communication of data over one or wired, wireless, or wired and wireless networks. Using the communication means 104, the control system 160 is capable of updating software and other operating data for the vending machine 100. In certain embodiments, the communication means 104 is capable of communicating with payment servers for authorization of payments for purchases made at the vending machine 100. The communication means 104 may be further used by the control system 160 to relay status information of the vending machine 100 and to receive additional advertising data such as advertising videos, for example, for display on the display screen 120.

The point of sale device 130 is configured to complete payment transactions for purchases at the vending machine 100. The point of sale device 130 may accept, in various embodiments, credit, debit, or similar payment cards, coins, or bills of currency. The point of sale device 130 is communicatively coupled to the control system 160 for communicating an authorization of payment for any item purchased at the vending machine 100. In some embodiments, the point of sale device 130 may include its own communication means for authorizing transactions at the vending machine 100. In general, upon selection of an item for purchase, the vending machine 100 directs the purchaser to complete the purchase using the point of sale device 130. The purchaser may then make a payment using the point of sale device 130 by swiping a credit card or depositing coins or other currency bills, for example. Upon the tender of full payment for a selected item for purchase, the vending machine 100 deposits the item in the vending tray 170, so that the purchaser is able to access the item purchased, completing the transaction.

In various embodiments, the display screen 120 comprises a "touch" display screen, permitting users to touch the display screen 120, as part of a graphical user interface. For example, a user is able to touch the display screen 120 to select an item to be purchased. In general and as described in further detail below, in various embodiments, a user of the vending machine 100 may touch the display screen 120 to operate the vending machine 100 and complete a transaction. With reference to FIG. 1, a user may touch any of the beverage items "A" to "F" to make a selection for purchase. In FIG. 1, item "A" has been selected, as illustrated in display section 124, and instructions to complete the transaction are provided in display section 122. As another example, for a user to select the item "B" for purchase, the user touches the display screen 120 at the location of the display of the item "B". In some embodiments, upon receiving a selection via the graphical user interface shown in FIG. 1, another graphical user interface may be displayed to show pricing, availability, and other information for the item selected for purchase. The control system 160 is configured to monitor for and detect the touch of the display screen 120 in the vicinity of the item "B" (and the other items), and discern which item is selected based on the user's touch. In some embodiments, arrows or other directional icons may be displayed, the selection of which causes a product highlight or focus to scroll or shift through a list of available items. Further selection of the currently-focused item, such as item "A" in FIG. 1, enables the purchase of that item. Once the control system 160 has determined an item selected for purchase, the control system 160 is configured to display instructions on the display screen 120 (and/or provide an audible prompt on via the speaker 102) directing the user to tender payment. It is noted that, as compared to conventional vending machines that include conventional "hard" buttons, the vending machine 100 relies upon a user to touch the display screen 120 for operation.

It is noted that the display screen 120, in various embodiments, is mounted on or within the vending machine 100 so that a person having a disability, particularly a visual disability, is able to easily determine the extent (e.g., boundaries) of the display screen 120 by touching the front of the vending machine 100. However, it is noted that the vending machine 100, the display screen 120, and the bezel 123, which is described in further detail below, are generally free from tactile or other relative or absolute indicators of position. In certain embodiments, the display screen 120 may be recessed into the front of the vending machine 100. This recessed mounting of the display screen 120 may be relied upon by a user to quickly ascertain the general dimensions of the display screen 120, so that instructions relative to lower, upper, right, and left corners of the display screen 120 may be easily understood.

In FIG. 1, a bezel or recess 123 is illustrated from a front surface of the vending machine 100 to a front surface of the display screen 120. The bezel 123 may take various shapes and depths among embodiments, depending upon the size the display screen 120 and the manner in which the display screen 120 is mounted on or within the vending machine 100. In various embodiments, the depth of the bezel 123 may range from 0 to 3 inches, for example. The bezel 123 may include substantially curved, angled, or chamfered corners, among other corner shapes. A surface of the bezel 123 may be substantially orthogonal to the surface of the vending machine 100 and the surface of the display screen 120. In other embodiments, the bezel 123 may include a surface that is curved or chamfered from the surface of the vending machine 100 to the surface of the display screen 120.

In certain exemplary embodiments, the bezel 123 is free from physically-distinguishing (e.g., tactile) features that indicate one or more relative or absolute positions on the bezel 123 or the display screen 120. Also, it is noted that the bezel 123 may surround the entire display screen 120 and, as such, the entire area surrounding the display screen 120 may be free from physically-distinguishing features that indicate one or more relative or absolute positions on the display screen 120. For example, in certain exemplary embodiments, the bezel 123 is free from raised or recessed embossments, discontinuous edges, or other indicators of a certain position on the bezel 123 or the display screen 120. In other words, the bezel 123 (and a surface of the bezel) may be smooth, continuous, and generally "featureless". Thus, a user of the vending machine 120 may be unable to (and need not) rely upon a tactile or similar indicator of a relative position on the bezel 123, such as a reference to a position at which the display 120 should be touched. It is noted that a shape of an outline of the bezel 123 may take one or a combination of regular or irregular portions among circular, wave, and straight-line shapes, while maintaining an overall smooth, continuous, and generally "featureless" surface. In embodiments where the display screen 120 is mounted substantially flush with the front of the vending machine 100, a user of the vending machine 100 may be able to determine a position and an extent of the display screen 120 based on a difference in materials of the display screen 120 and the front surface of the vending machine 100. Alternatively, the user may be able to determine the position and extent of the display screen 120 based on an edge or groove where the display screen 120 meets the front surface of the vending machine 100.

The vending machine 100 includes an accommodation mode of operation, permitting special functionality and features for accommodating users having disabilities, particularly visual disabilities. As illustrated in FIG. 1, the selection (or accommodation mode entry) area 150 may be used to enter the accommodation mode, which is described in further detail below with reference to FIGS. 2-5. The selection area 150 is designated in FIG. 1 using a hashed outline, because the display on the display screen 120 does not include a "button" or other visual indicator that the selection area 150 exists. In other words, the selection area 150 is "hidden," although actively monitored by the control system 160 to determine whether a user touches the display screen 120 within the vicinity of the selection area 150. In various embodiments, the selection area 150 may be positioned proximate to any corner of the display screen 120.

In an exemplary embodiment, the vending machine 100 periodically displays instructions for entering accommodation mode. For example, a banner may be displayed periodically within the display section 122, indicating that the accommodation mode is available by touching the lower right corner of the display screen 120 within the selection area 150. The display of the instructions for entry into the accommodation mode may be displayed in the display section 122, for example, or in any other display section. In other embodiments, the display of the instructions may be presented aperiodically. Upon touching the display screen 120 within the vicinity of the selection area 150, the vending machine 100 is configured to enter the accommodation mode. While selection of an item to be purchased may be generally accomplished by touching one of the items on the display screen 120 in FIG. 1, the operation of the vending machine 100 in the accommodation mode permits the selection of an item in an alternative mode of operation designed to accommodate persons having disabilities.

As indicated above, the display screen 120 may display an indicator or other instructions related to the availability of the accommodation mode. Besides visible displays indicating the availability of the accommodation mode, the vending machine 100 may also audibly indicate the availability of the accommodation mode via the speaker 102. The audible indications may be periodic or aperiodic, in various embodiments. Even if the display screen 120 does not provide any visual or audible indication that a touch of the display screen 120 within the vicinity of the selection area 150 will cause the vending machine 100 to enter into the accommodation mode, the selection area 150 is monitored by the control system 160, in case it is touched by a user. As described herein, a "touch" of the display screen 120 may comprise a single touch (or press) at one location or a "multiple-press" of the display screen 120, for example. A "multiple-press," as described herein, comprises at least two successive and independent touches of the display screen 120 at a substantially same location (e.g., within a virtual button or threshold vicinity about the button) on the display screen 120 within a certain threshold time period. In certain embodiments, the accommodation mode of vending machine 100 may be entered upon a user's single touch or multiple-press within the vicinity of the selection area 150.

Figure 2:
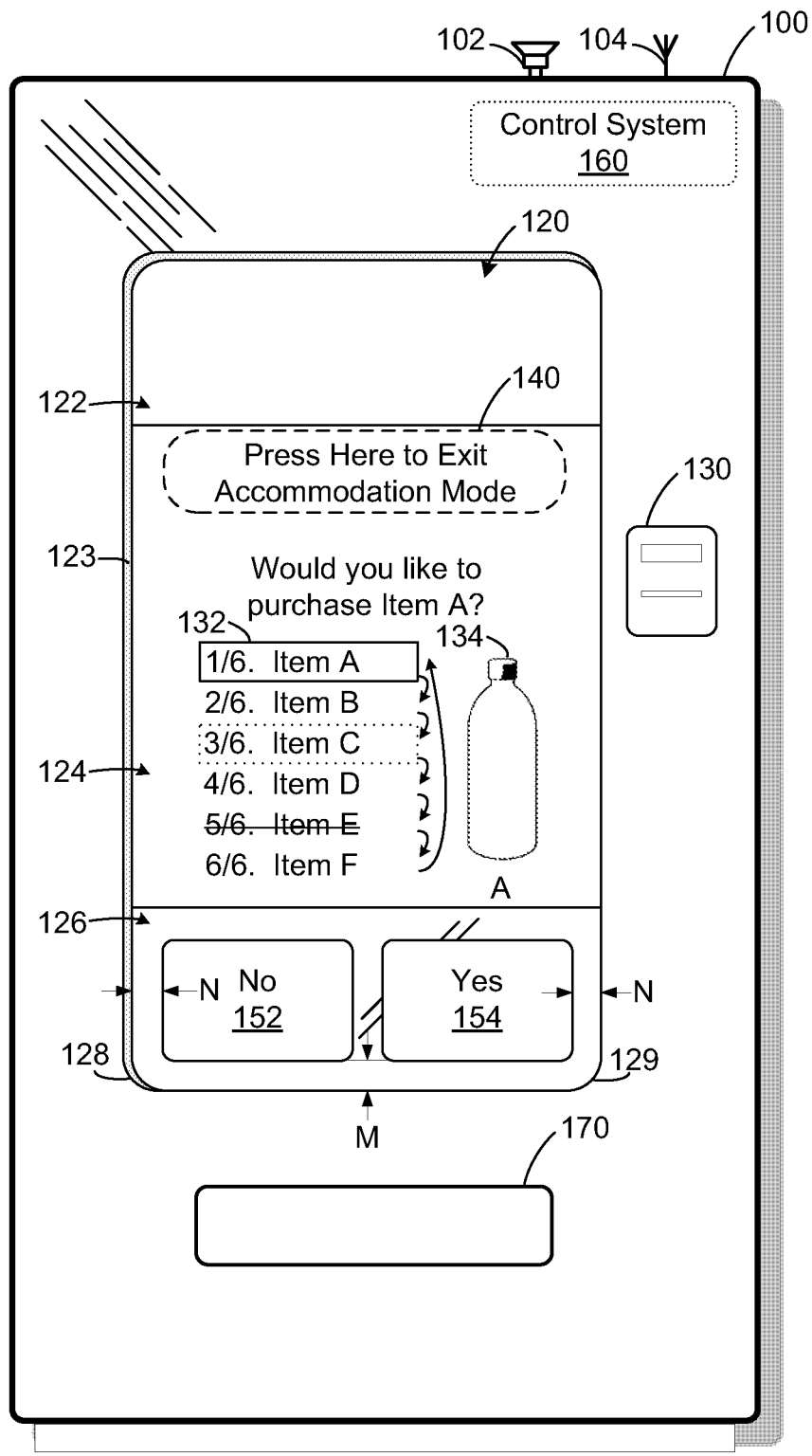
FIG. 2 provides an illustration of a vending machine displaying an accommodation mode menu according to an example embodiment described herein.

Turning to FIG. 2, a display associated with the accommodation mode is illustrated. Upon entry into the accommodation mode, the display on the display screen 120 changes from an item-view to a list-view. Generally, after receiving an instruction to enter the accommodation mode, the control system 160 is configured to reset and start an accommodation mode timer. Further, the control system 160 is configured to display an accommodation menu comprising at least one selection button and a list of items available for vending. In FIG. 2, the list of items available for vending includes items "A" to "F". Further, the selection buttons displayed on the display screen 120 include the No button 152 and the Yes button 154, as illustrated in FIG. 2. The buttons and the locations of the buttons illustrated in FIG. 2 are provided by a way of example only and other buttons and positions of buttons are within the scope and spirit of the embodiments described herein.

After receiving the instruction to enter the accommodation mode, the control system 160 is further configured to announce a selected item of the list of items available for vending. With reference to FIG. 2, the item A is initially selected for purchase, as designated by the selection box 132, and the control system 160 is configured to audibly announce that the item A is selected for purchase. For example, the control system 160 is configured to announce the item name and/or other characteristics of item A using the speaker 102. In addition to the selection box 132, it is noted that the display screen 120 may also display a picture of the currently-selected item for purchase, as illustrated by reference 134. In various embodiments, upon selection of any item to be purchased in the accommodation mode, the control system 160 is configured to announce the item selected for purchase via the speaker 102. The announcement may include any information related to the item such as a type or name of the item, a volume or amount of the item, and/or a price for the item. The announcement may further include an indication of an item number of the selected item and a total number of items available in the list of items available for purchase. As one example, upon selection of item A, the control system 160 may announce that item A is a first of six items available for purchase at the vending machine 100, that item A is a 20 ounce bottle of a certain type or flavor of soda, and that item A costs $1.50 to purchase. Further, the announcements may provide instructions for using the No and Yes buttons 152 and 154 to purchase item A or to select another item for purchase, as described in further detail below. If item A is selected for purchase using the Yes button 154, for example, the announcements may provide instructions for tendering payment using the point of sale device 130. The announcements described above are provided by way of example only and other announcements are within the scope and spirit of the embodiments described herein.

It is noted that the control system 160 is configured to operate based on several parameters that define the operation of the vending machine 100. For example, the control system 160 is configured to operate with a parameter that defines a sound volume output by the speaker 102. This sound volume parameter may be set via software, for example, to determine a volume used in association with advertisements or other messages provided by the vending machine 100 via the speaker 102. It is noted that, while this parameter may be defined to a low or no volume output setting in a primary mode of operation, the control system 160 is configured to override a low or no volume output setting while the vending machine 100 operates in the accommodation mode. Specifically, even when the vending machine 100 has been configured to output a low or no volume output in the primary mode of operation, for example, if the vending machine 100 has been installed in a location that requires relative quiet, the vending machine 100 is still configured to provide audible prompts and other outputs at a nominal volume in the accommodation mode despite the low or no volume output in the primary mode.

Referring again to FIG. 2, the list of items available for vending may include an indication that an item is unavailable for purchase. In FIG. 2, item E is unavailable for purchase, as indicated by the strikethrough of item E. In alternative embodiments, the list of items available for vending may omit Item E, if item E is no longer available because it is sold out, for example. After entering accommodation mode, the selection of an item for vending can be made using the No and Yes buttons 152 and 154. If, after hearing the announcement for item A, the purchaser determines that item A is not desired, the user may use the No button 152 to select another item. Generally, the accommodation mode provides announcements including instructions for persons having visual disabilities to touch the display screen 120 at positions that approximate the positions of the buttons 152 and 154, depending upon whether an item is desired or not. For example, upon the announcement that item A is selected for purchase, the control system 160 may announce that item A may be selected for purchase by touching or multiple-pressing the lower right corner of the display screen 120 (i.e., the Yes button 154). Additionally, the control system 160 may announce that selection of another (i.e., a different) item for purchase may be made by touching or multiple-pressing the lower left corner of the display screen 120 (i.e., the No button 152). As discussed above, in certain embodiments, the display screen 120 may be recessed into the front of the vending machine 100. This recessed mounting of the display screen 120 may be relied upon by a user to quickly ascertain the general dimensions of the display screen 120, so that instructions relative to lower, upper, right, and left corners of the display screen 120 may be easily understood.

In certain embodiments, it is noted that a predetermined distance may be used to separate an edge of the display screen 120 and one or more of the selection buttons used in the primary or accommodation modes of operation. As illustrated in FIG. 2, a predetermined distance N is provided between the left edge of the display screen 120 and the left boundary edge of the No button 152. Similarly, a predetermined distance M is provided between the bottom edge of the display screen 120 and the bottom edge of the No button 152. Similarly, a predetermined distance N is provided between a right edge of the display screen 120 and a right boundary edge of the Yes button 154. The predetermined distance M is also provided between the bottom edge of the display screen 120 and a bottom edge boundary of the Yes button 154. Due to the predetermined distances, a user of the vending machine 100 is able to determine the corners of the display screen 120, such as the bottom left corner 128 and the bottom right corner 129, without actively asserting or "pressing" either of the buttons 152 or 154. In various embodiments, the a value of the predetermined distances N and M may be determined for ease of use of the vending machine 100 and may range from 0.2 to 5 inches, for example. The sizing of the buttons 152 and 154 may also be selected for ease of use of the vending machine 100 and defined based on a certain percentage of the total size of the display screen 120, a length of the display screen 120, a width of the display screen 120. Further, the sizing of the either one of the buttons 152 and 154 may be defined based on the sizing of the other one of the buttons 152 and 154 and, in certain embodiments, the buttons 152 and 154 may have different sizes.

While operating in the accommodation mode, the control system 160 is further configured to determine whether the selected item (e.g., item A in FIG. 2) has not been selected for vending. For example, upon determining that the No button 152 has been touched or multiple-pressed, the control system 160 determines that the item A has not been selected for vending. When determining that the selected item has not been selected for vending, the control system 160 is further configured to select a next item of the list of available items for vending and announce the next item of the list of available items for vending. Thus, the selection box 132 will move or rotate through the list of items available for purchase each time a user indicates that the currently selected item is not desired for purchase. It is noted that, each time a new item is selected, the newly-selected item is announced in exemplary embodiments. The announcement may include details of the selected item, an item number of the selected item, and a total number of items in a list of items available for purchase, as discussed above. In other words, upon the selection of the item C, an announcement may be provided over the speaker 102 that item 3 of 6 has been selected, along with other details regarding item C.

When the control system 160 determines that a selected item in the list of items available for vending has been selected for purchase based on a user's touch or multiple-press of the Yes button 154, for example, the control system 160 is configured to prompt the user for payment. The user may then turn to the point of sale device 130 to tender payment and complete the transaction. As discussed above, the point of sale device 130 may accept, in various embodiments, credit, debit, or similar payment cards, coins, or bills of currency.

As noted above, an accommodation mode timer is started upon the entry of the vending machine 100 into the accommodation mode. The accommodation mode timer is used to exit the accommodation mode, for example, if a user does not provide any selection of an item for vending or does not provide any feedback to the vending machine 100 within a certain period of time defined by the accommodation mode timer. As described in further detail below, the control system 160 maintains several timers for coordinating operation of the vending machine 100, depending upon the current state of the vending machine 100 in the accommodation mode. As an alternative means to exit the accommodation mode, one or more selection areas, such as the selection area 140, may be provided for a user to exit the accommodation mode. A user may press the display screen 120 within the vicinity of the selection area 140 to exit the accommodation mode and return to the primary mode of operation illustrated in FIG. 1. The position and size of the selection area 140 may vary in alternative embodiments. In exemplary embodiments, the selection area 140 is positioned less than 48 inches from the floor, for example, to adhere to certain guidelines for disability accommodation and accessibility. Similarly, although the No and Yes buttons 152 and 154 may be positioned in various locations on the display screen 120, they are generally positioned less than 48 inches from the floor for disability accommodation and accessibility.

Figure 3:
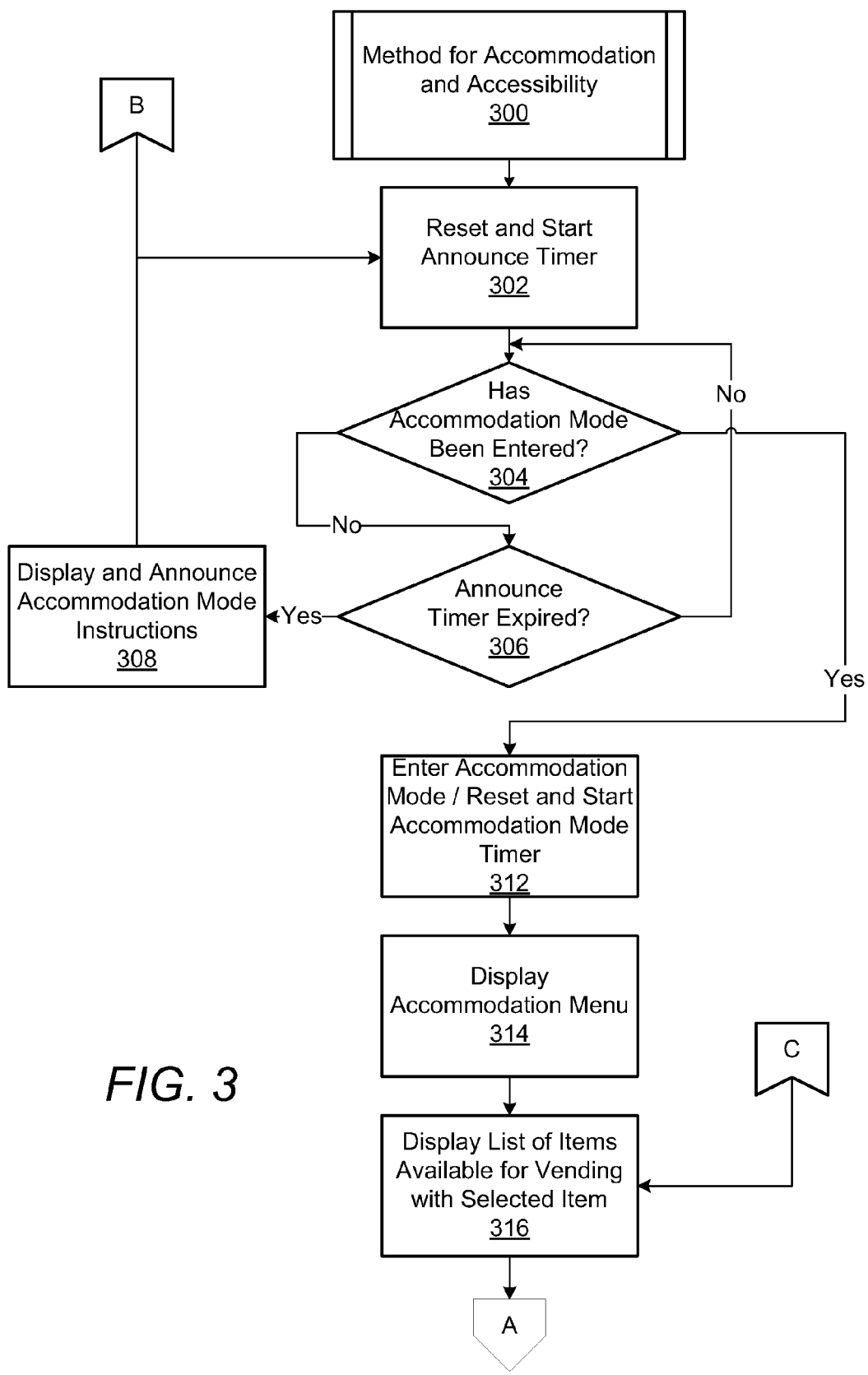
FIG. 3 provides an illustration of a method of vending accommodation for disability according to an example embodiment described herein.
Figure 4:
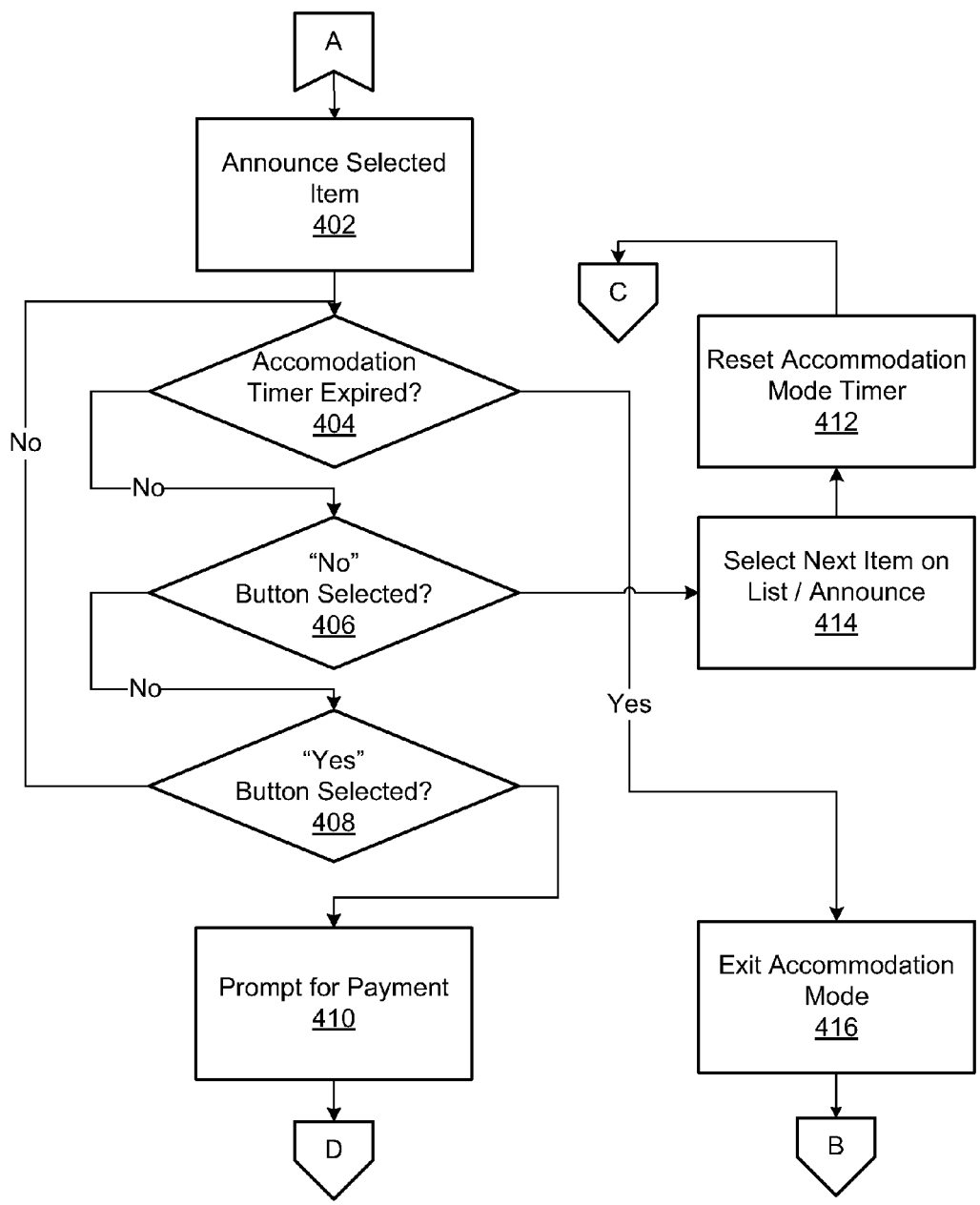
FIG. 4 provides a further illustration of the method of vending accommodation according to an example embodiment described herein.
Figure 5:
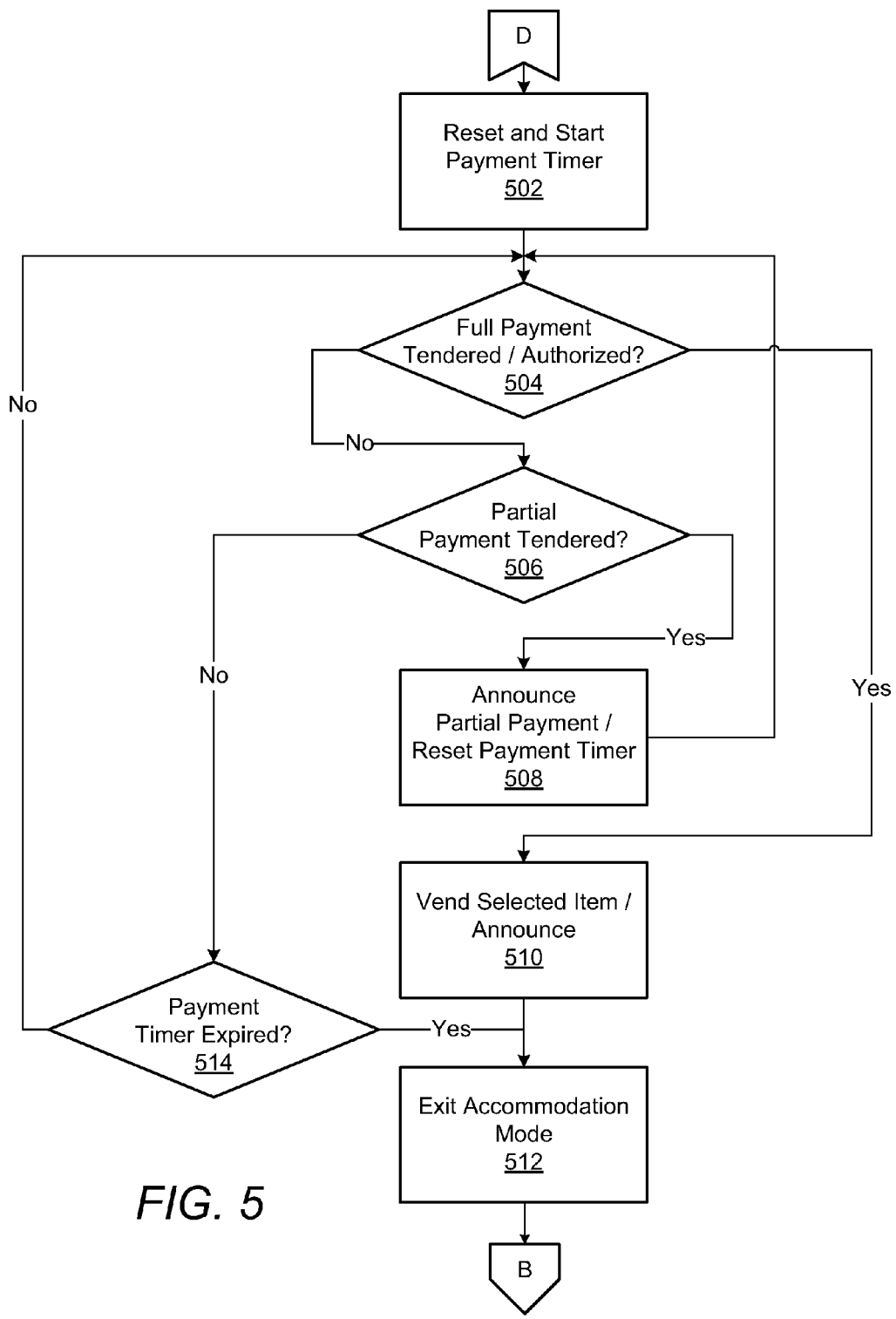
FIG. 5 provides a further illustration of the method of vending accommodation according to an example embodiment described herein.

Before turning to the process flow diagrams of FIGS. 3-5, it is noted that the embodiments may be practiced using an alternative order of the steps illustrated in FIGS. 3-5. That is, the process flows illustrated in FIGS. 3-5 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. It is also noted that, although the process in FIGS. 3-5 is described in connection with the vending machine 100, the process may be performed by machines that vary from the vending machine 100, in light of the fact that the vending machine 100 is provided as an example embodiment. One skilled in the art would also recognize and appreciate that aspects of the process are applicable to machines other than vending machines, such as Automated Teller Machines ("ATMs"), rental machines, ticket sales machines, point of sale devices, voting booth machines, reservation machines, or other kiosks, for example.

Turning to FIG. 3, a method 300 for accommodation and accessibility is illustrated. In a primary mode of operation of the vending machine 100, an announce timer is reset and started at step 302 by the control system 160. The announce timer may be used by the control system 160 in various embodiments to periodically display an indication that an accommodation mode of operation is available for use by users. For example, the announce timer may be used to periodically display a banner or other informative graphic on the display screen 120, highlighting the fact that the vending machine 100 includes an accommodation mode of operation. At step 304, the control system 160 determines whether accommodation mode has been entered. The control system 160 may determine that accommodation mode has been entered according to a touch or multiple-press within a vicinity of the selection area 150 of FIG. 1, for example. When the control system 160 determines at step 304 that accommodation mode has not been entered, the method 300 proceeds to step 306 where the control system 160 determines whether the announce timer has expired. If the announce timer has not expired, the method 300 proceeds back to decision step 304. On the other hand, if the announce timer has expired, the method 300 proceeds to step 308 where the control system 160 is configured to display accommodation mode instructions on the display screen 120. As described above, the accommodation mode instructions may include a visual display and/or an announcement by the speaker 102 regarding the availability of the accommodation mode of operation. After the display and announcement at step 308, the announce timer is reset at step 310.

When the control system 160 determines that the accommodation mode has been entered at step 304, the method 300 proceeds to step 312 where the vending machine 100 enters the accommodation mode and resets and starts an accommodation mode timer. In various embodiments, the entry into accommodation mode may be precipitated by a user's selection of the selection area 150, for example. As discussed above, the accommodation mode timer may be maintained by and under the control of the control system 160. The method 300 then proceeds to step 314 where the control system 160 is configured to direct the display screen 120 to display the accommodation menu. The accommodation menu, in various embodiments, includes at least one selection button and a list of items available for vending. As part of the accommodation menu, at step 316, the control system 160 is configured to display a list of items available for vending along with a currently-selected item for vending. As one non-limiting example of an accommodation menu, the menu illustrated in FIG. 2 may be displayed in response to the execution of steps 314 and 316.

Turning to FIG. 4, the method 300 proceeds to step 402 where the control system 160 is configured to announce the currently-selected item. As discussed above, the announcement may be made by the speaker 102 and may include specifics regarding the selected item such as an item number of the selected item, a total number of items in the list of items available, a product name and/or description of the item, a volume of the item, and a price of the item. The announcement may also include instructions for selecting the item for purchase or selecting an alternative item for purchase. Particularly, the announcement may include instructions regarding a general area or vicinity on the display screen 120 for touching the display screen 120 to either select the item for purchase or select another item for purchase. The instructions may state that the selected item may be purchased by touching or multiple-pressing in the vicinity of, for example, the lower right corner 129 of the display screen 120. The instructions may also state that another (i.e., a different) item may be selected by touching or multiple-pressing in the vicinity of, for example, the lower left corner 128 of the display screen 120. The instructions may, additionally or alternatively, refer to the lower left and lower right corners 128 and 129 as No and Yes buttons. In that context, the instructions may suggest touching or multiple-pressing the No or Yes buttons 152 or 154.

Proceeding to step 404, after announcing the selected item at step 402 and the instructions, the control system 160 determines whether the accommodation timer has expired at step 404. If the control system 160 determines that the accommodation timer has not expired at step 404, the method proceeds to step 406 where the control system 160 determines whether a vicinity of the No button 152 has been selected. In connection with the accommodation mode display illustrated in FIG. 2, for example, the No button 152 may be selected by a touch or multiple-press of an approximate lower left corner of the display screen 120. If the control system 160 determines that the No button 152 is not selected at step 406, the method proceeds to step 408 where the control system 160 determines whether the Yes button 154 has been selected. In connection with FIG. 2, for example, the Yes button 154 may be selected by a touch or multiple-press of the approximate lower right corner of the display screen 120.

If the control system 160 determines that the Yes button 154 has not been selected at step 408, the method 300 proceeds back to step 404 where the control system 160 again determines whether the accommodation timer has expired. Here, it is noted that the control system 160 awaits for a user selection or other user feedback during a time period while the accommodation timer is running If the accommodation timer expires before a user selection or other user feedback is provided, the control system 160 proceeds to step 416 where the accommodation mode is exited. After exiting the accommodation mode at step 416, the method proceeds back to step 302 where the primary mode of operation is executed and the announce timer is reset and started at step 302. In the primary mode of operation, the display on the display screen 120 may return to one similar to that illustrated in FIG. 1.

Referring again to FIG. 4, when, at step 406, the control system 160 determines that the No button 152 is selected, the method proceeds to step 414 where the control system 160 selects a next item on the list of items available for vending. As illustrated in FIG. 2, for example, the selection area 132 may be moved at step 414 to select a next item on the list of items available for vending. Based on consecutive selections of the No button 152, it is possible for a user to rotate through the entire list of items available for vending, as suggested by the arrows in FIG. 2. In certain embodiments, after step 414, the method 300 proceeds to step 412 where the accommodation mode timer is reset by the control system 160. Here, it is noted that the accommodation mode timer is reset as feedback was provided from a user of the vending machine 100 (e.g., one of the buttons 152 or 154 was touched), to maintain the vending machine 100 in the accommodation mode of operation.

After step 412 and with reference again to FIG. 3, the method 300 then proceeds to step 316 where the control system 160 is configured to display the list of items available for vending, with the next item selected. Here, it is noted that the display of FIG. 2 may be provided with an updated position of the selection box 132, according to the item which is currently selected. After the display of the display screen 120 has been updated, the method 300 proceeds again to step 402 of FIG. 4, where an announcement is made for the next item selected.

At step 408, when the control system 160 determines that the Yes button 154 has been selected for the currently-selected item, the method 300 proceeds to step 410 where the control system 160 prompts for payment. The prompt may include instructions for use of the point of sale device 130. For example, the instructions may include a description of a relative location on the vending machine 100 where the point of sale device 130 may be found, based on other features of the vending machine 100 (e.g., to the right of the display screen 120). The instructions may also include a statement of an amount of money necessary to complete a transaction at the vending machine 100 for the currently-selected item, for example.

The method 300 then proceeds to step 502, illustrated in FIG. 5. At step 502, the control system 160 resets and starts a payment timer. At step 504, the control system 160 determines whether full payment has been tendered or authorized. In other words, in connection with feedback provided by the point of sale device 130, the control system 160 determines whether full payment has been tendered by a user entering or feeding coins or other bills of currency into the point of sale device 130, or whether full payment has been authorized by a user entering or swiping a credit card at the point of sale device 130. When the control system 160 determines that full payment has been tendered or authorized at step 504, the method 300 proceeds to step 510 where the selected item is vended and an announcement of vending is made by the control system 160 using the speaker 102. For example, the announcement may include a description of a relative location on the vending machine 100 where the vending tray 170 may be found, based on other features of the vending machine 100 (e.g., below the display screen 120). After the selected item is vended at step 510, the method proceeds to step 512 where the accommodation mode is exited. The method 300 then proceeds again to FIG. 3 where the announce timer is reset and started at step 302 by the control system 160.

Returning to FIG. 5, when, at step 504, the control system 160 determines that full payment has not been tendered or authorized, the method 300 proceeds to step 506 where the control system 160 determines whether partial payment has been tendered. When the control system 160 determines that partial payment has been tendered at step 506, the method 300 proceeds to step 508 where the control system 160 announces using the speaker 102 that partial payment has been made and resets the payment timer. The announcement at step 508 may include a statement that a certain amount of payment has been tendered, and a remaining amount of payment is required. For example, the announcement may state that $1.00 has been tendered and another $0.50 is required for purchase of a selected item. Based on the announcement at step 508, a user of the vending machine 100 is able to easily determine the requirements for completing the purchase of the selected item.

It is noted that the payment timer is reset at step 508, as feedback was provided from a user of the vending machine 100 (e.g., partial payment was provided). In certain aspects, after a credit or other similar payment card has been swiped at the point of sale device 130, the point of sale device 130 and the control system 160 are configured to request authorization for payment, based on communication with a payment server or other payment network via the communication means 104 or another communication means. Because awaiting authorization from the payment server or other network may take some time, the point of sale device is configured to provide an indication to the control system 160 that a payment card has been swiped, even before any authorization is available, in certain embodiments. Based on the fact that a payment card has been swiped and authorization is pending, the control system 160 may, in certain embodiments, reset the payment timer. Alternatively, the payment timer may be set to be long enough to accommodate a user swiping a payment card at the point of sale device 130 and for the point of sale device 130 to request and obtain authorization for payment.

The method 300 then proceeds again to step 504, where the control system 160 determines whether full payment has been tendered or authorized. Upon a determination that full payment has been tendered, the method 300 proceeds to steps 510 and 512, as discussed above. If, at step 506, the control system 160 determines that partial payment has not been tendered, the method 300 proceeds to step 514 where the control system 160 determines whether the payment timer has expired. If the control system 160 determines at step 514 that the payment timer has expired, the method 300 proceeds to step 512 where the accommodation mode is exited. Alternatively, if the control system 160 determines at step 514 that the payment timer has not expired, the method 300 proceeds back to step 504, as illustrated in FIG. 5. Here, it is noted that the vending machine 100 awaits payment for at least the amount of time defined by the payment timer. If payment (or at least partial payment) is not made by a user before the expiration of the payment timer, the method 300 will exit the accommodation mode and return to a primary mode of operation.

Figure 6:
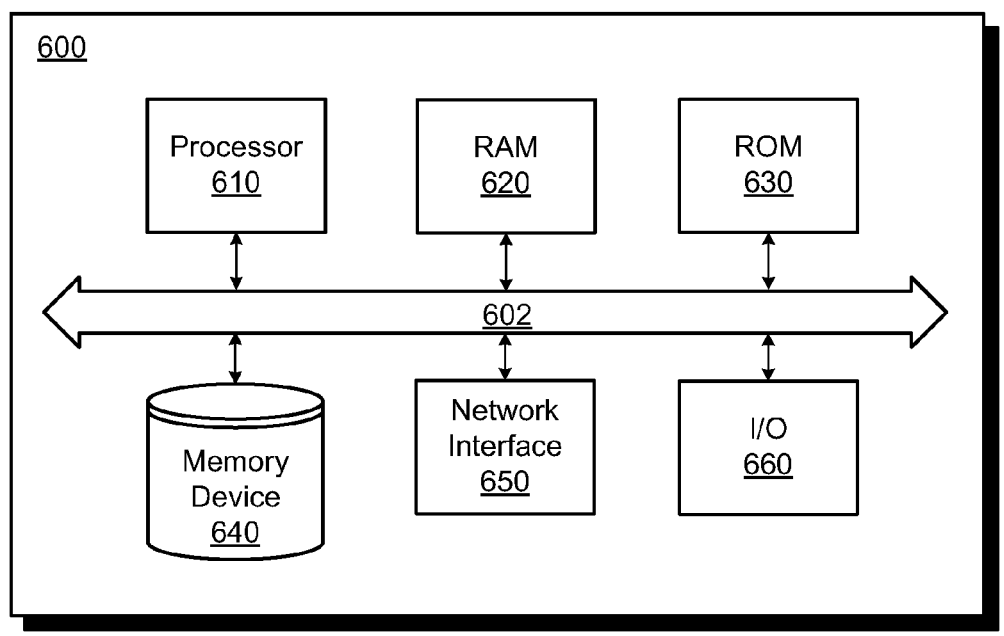
FIG. 6 provides an illustration of a general purpose computer device according to an example embodiment described herein.

Turning to FIG. 6, an example hardware diagram of a general purpose computer 600 is illustrated. The control system 160 may be implemented, in part, using one or more elements of the general purpose computer 600. The computer 600 includes a processor 610, a Random Access Memory ("RAM") 620, a Read Only Memory ("ROM") 630, a memory device 640, a network interface 650, and an Input Output ("I/O") interface 660. The elements of the computer 600 are communicatively coupled via a bus 602.

The processor 610 comprises any well known general purpose arithmetic processor or Application Specific Integrated Circuit ("ASIC"). The RAM and ROM 620 and 630 comprise any well known random access or read only memory device that stores computer-readable instructions to be executed by the processor 610. The memory device 630 stores computer-readable instructions thereon that, when executed by the processor 610, direct the processor 610 to execute various aspects of the present invention described herein. When the processor 610 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 630 comprises one or more of an optical disc, a magnetic disc, a semiconductor memory (i.e., a flash based memory), a magnetic tape memory, a removable memory, combinations thereof, or any other known memory means for storing computer-readable instructions. The network interface 650 comprises interfaces to communicate over data networks, such as one or more of the MDB, USB, and VCCS interfaces described above. The I/O interface 660 comprises other device input and output interfaces. The bus 602 electrically and communicatively couples the processor 610, the RAM 620, the ROM 630, the memory device 640, the network interface 650, and the I/O interface 660, so that data and instructions may be communicated among them. In operation, the processor 610 is configured to retrieve computer-readable instructions stored on the memory device 640, the RAM 620, the ROM 630, or another storage means, and copy the computer-readable instructions to the RAM 620 or the ROM 630 for execution, for example. The processor 610 is further configured to execute the computer-readable instructions to implement various aspects and features of the present invention. For example, the processor 610 may be adapted and configured to execute the methods or processes described above with reference to FIGS. 3-5, including the processes described as being performed by the control system 160.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method for accommodation and accessibility, comprising:
    operating a vending machine in a primary mode;
    announcing instructions for entry into an accommodation mode;
    before receiving an instruction to enter the accommodation mode, resetting and starting an accommodation announcement timer;
    determining whether the accommodation announcement timer has expired;
    when determining that the accommodation announcement timer has expired, announcing accommodation mode instructions and resetting the accommodation announcement timer;
    receiving an instruction to enter the accommodation mode;
    after receiving the instruction to enter the accommodation mode, entering the accommodation mode and resetting and starting an accommodation mode timer, wherein the accommodation mode is an alternative mode of operation from the primary mode designed to accommodate persons having disabilities;
    announcing a selected item of a list of items available for vending;
    determining, by a computing unit, whether the selected item has been selected for vending based on a touch of at least one selection button on a display; and
    when determining that the selected item has been selected for vending, prompting for payment.

2. The method for accommodation and accessibility of claim 1, further comprising
    determining whether the selected item has not been selected for vending based on a touch of at least one other selection button on the display; and
    when determining that the selected item has not been selected for vending,
        selecting a next item of the list of items available for vending; and
        announcing the next item of the list of items available for vending.

3. The method for accommodation and accessibility of claim 1, wherein
    announcing the selected item comprises announcing at least one of a product type or name of the item, a volume or amount of the item, and a price for the item.

4. The method for accommodation and accessibility of claim 1, wherein
    announcing the selected item comprises announcing an item number of the selected item in the list of items available, a total number of items in the list of items available, and a product type or name of the selected item.

5. The method for accommodation and accessibility of claim 1, further comprising
    displaying an accommodation menu comprising a display of the list of items available for vending, a first button, and a second button on the display screen, wherein
    determining whether the selected item has been selected for vending comprises determining, by the computing unit, whether the first button has been touched on the display screen.

6. The method for accommodation and accessibility of claim 5, wherein
displaying a first button and a second button on a display screen further comprises displaying the first button proximate to the lower right corner of the display screen and displaying the second button proximate to the lower left corner of the display screen.

7. The method for accommodation and accessibility of claim 6, wherein
displaying the first button proximate to the lower right corner of the display screen comprises displaying the first button at least a predetermined distance from a bottom edge of the display screen and at least a predetermined distance from a right edge of the display screen.

8. The method for accommodation and accessibility of claim 6, wherein
displaying the second button proximate to the lower left corner of the display screen comprises displaying the second button at least a predetermined distance from a bottom edge of the display screen and at least a predetermined distance from a left edge of the display screen.

9. The method for accommodation and accessibility of claim 1, further comprising,
after receiving the instruction to enter the accommodation mode, determining whether the accommodation mode timer has expired; and
when determining that the accommodation mode timer has expired, exiting the accommodation mode.

10. The method for accommodation and accessibility of claim 1, further comprising,
after prompting for payment, determining whether full payment has been tendered or authorized or whether partial payment has been tendered;
when determining that partial payment has been tendered, announcing an amount of partial payment or an additional amount required for tender of full payment; and
when determining that full payment has been tendered or authorized, vending the selected item.

11. The method for accommodation and accessibility of claim 1, further comprising,
after prompting for payment, resetting and starting a payment timer;
determining whether at least partial payment has been tendered before expiration of the payment timer; and
when determining that at least partial payment has been tendered before expiration of the payment timer, resetting the payment timer.

12. A method for accommodation and accessibility, comprising:
announcing instructions for entry into an accommodation mode;
before receiving an instruction to enter the accommodation mode, resetting and starting an accommodation announcement timer;
determining whether the accommodation announcement timer has expired;
when determining that the accommodation announcement timer has expired, announcing accommodation mode instructions and resetting the accommodation announcement timer;
receiving an instruction to enter the accommodation mode;
displaying an accommodation menu on a display screen, wherein the accommodation menu is displayed during the accommodation mode, which is an alternative mode of operation from a primary mode designed to accommodate persons having disabilities, the accommodation menu comprising a list of items available for vending and at least one selection button proximate to a corner of the display screen;
determining whether a selected item has been selected for vending based on a multiple-press of the at least one selection button; and
when determining that the selected item has been selected for vending, prompting for payment.

13. The method for accommodation and accessibility of claim 12, further comprising
determining whether the selected item has not been selected for vending; and
when determining that the selected item has not been selected for vending,
selecting a next item of the list of items available for vending; and
announcing the next item of the list of items available for vending.

14. The method for accommodation and accessibility of claim 12, further comprising
announcing at least one of a product type or name of the selected item, a volume or amount of the selected item, and a price for the selected item.

15. The method for accommodation and accessibility of claim 12, further comprising,
after prompting for payment, determining whether full payment has been tendered or authorized or whether partial payment has been tendered;
when determining that partial payment has been tendered, announcing an amount of partial payment or an additional amount required for tender of full payment; and
when determining that full payment has been tendered or authorized, vending the selected item.

16. An apparatus for accommodation and accessibility, comprising:
a display screen having a substantially smooth surface that displays items available for vending;
a speaker; and
a control system configured to
operate a vending machine in a primary mode,
announce instructions for entry into an accommodation mode of operation for vending the items available for vending, wherein the accommodation mode is an alternative mode of operation from the primary mode designed to accommodate persons having disabilities,
before receiving an instruction to enter the accommodation mode, reset and start an accommodation announcement timer,
determine whether the accommodation announcement timer has expired,
when determining that the accommodation announcement timer has expired, announce accommodation mode instructions and reset the accommodation announcement timer, and
monitor an accommodation mode entry area proximate to a corner of the display screen for a multiple-press comprising at least two successive and independent touches of the display screen at a substantially same location on the display screen within a certain threshold time period.

17. The apparatus for accommodation and accessibility of claim 16, further comprising a smooth bezel surrounding the entire display screen, wherein the bezel is free from physically-distinguishing features that indicate one or more relative to absolute positions on the bezel or the display screen.

18. The apparatus for accommodation and accessibility of claim 16, wherein the accommodation mode entry area begins at a predetermined distance from a side edge of the display screen and a predetermined distance from a bottom edge of the display screen.

19. The apparatus for accommodation and accessibility of claim 16, wherein the control system is further configured to
- upon entry into the accommodation mode of operation, announce instructions for selection and non-selection of at least one item available for vending, and
- monitor selection and non-selection areas proximate to two corners of the display screen for a multiple-press.

* * * * *